(12) United States Patent
Schuler et al.

(10) Patent No.: US 9,108,127 B2
(45) Date of Patent: Aug. 18, 2015

(54) DIRECTED HYDROBURST SYSTEM FOR CLEANING FLAT SCREENS

(71) Applicant: Bilfinger Water Technologies Inc., New Brighton, MN (US)

(72) Inventors: Tom Schuler, Bethel, MN (US); Michael Ekholm, Minneapolis, MN (US)

(73) Assignee: Bilfinger Water Technologies, Inc., New Brighton, MN (US)

( * ) Notice: Subject to any disclaimer, the term of this patent is extended or adjusted under 35 U.S.C. 154(b) by 0 days.

(21) Appl. No.: 13/964,725

(22) Filed: Aug. 12, 2013

(65) Prior Publication Data

US 2014/0047664 A1    Feb. 20, 2014

Related U.S. Application Data

(63) Continuation of application No. 13/228,228, filed on Sep. 8, 2011, now Pat. No. 8,505,154.

(51) Int. Cl.
| | |
|---|---|
| *A47L 5/38* | (2006.01) |
| *B01D 29/66* | (2006.01) |
| *B01D 35/02* | (2006.01) |
| *B01D 29/11* | (2006.01) |
| *B01D 29/46* | (2006.01) |

(52) U.S. Cl.
CPC ............ *B01D 29/661* (2013.01); *B01D 29/114* (2013.01); *B01D 29/46* (2013.01); *B01D 35/02* (2013.01)

(58) Field of Classification Search
USPC ......... 15/301, 302, 316.1, 77, 88, 160, 220.1, 15/220.3, 220.4, 301.1, 330, 345; 210/170.09, 333.01, 333.1, 342; 134/109, 110, 111
See application file for complete search history.

(56) References Cited

U.S. PATENT DOCUMENTS

| | | | |
|---|---|---|---|
| 3,881,209 | A | 5/1975 | Reinitz |
| 4,420,004 | A | 12/1983 | Jensen |
| 5,372,153 | A | 12/1994 | Dobson |

(Continued)

FOREIGN PATENT DOCUMENTS

| | | |
|---|---|---|
| JP | 53-32415 | 3/1978 |
| JP | 58-99316 | 7/1983 |

OTHER PUBLICATIONS

Australian Intellectual Property Office, Australian Patent Application No. 2012216481 Office Action dated Nov. 21, 2013, pp. 1-3.

(Continued)

*Primary Examiner* — Dung Van Nguyen
(74) *Attorney, Agent, or Firm* — Moore & Van Allen PLLC

(57) ABSTRACT

A screen intake system has a body with an open end and a chamber. A flat screen is disposed at the open end of the body. To keep the screen clear of debris, an airburst system has pipes disposed in the chamber. The pipes dispose parallel to one another adjacent the flat screen, and each of the pipes has orifices in a side facing the flat screen. Directors are disposed along the backs of the pipes in a lattice, and each of the directors has a channel in which the pipe disposes. Compressed air released by valves from a tank dispersed from the pipe's orifices. Each of the directors directs the resulting water/airburst from the orifices toward the adjacent flat screen to clear it of debris.

19 Claims, 11 Drawing Sheets

(56) References Cited

U.S. PATENT DOCUMENTS

| | | | |
|---|---|---|---|
| 5,398,363 | A | 3/1995 | Medearis |
| 6,174,382 | B1 | 1/2001 | Cord |
| 6,584,991 | B1 | 7/2003 | Ries |
| 6,712,959 | B2 | 3/2004 | Ekholm |
| 7,867,395 | B2 | 1/2011 | Ekholm |
| 7,950,527 | B2 | 5/2011 | Osborne |
| 8,505,154 | B2 * | 8/2013 | Schuler et al. ............ 15/302 |
| 2007/0017549 | A1 | 1/2007 | Ekholm |

OTHER PUBLICATIONS

Canadian Patent Office, Canadian Patent Application No. 2,788,293 Office Action dated Dec. 18, 2013, pp. 1-2.

European Patent Office, European Patent Applicaiton No. 12183752.0 Office Action dated Mar. 4, 2014, pp. 1-4.

European Patent Office, European Patent Applicaiton No. 12183752.0 Extended European Search Report dated Jan. 8, 2013, pp. 1-5.

Cook Legacy Coating Company, "The Cook Book: Water Intake System Design & Technology," downloaded from <http://waterscreen.com/docs/Cook%20Book%2031110.pdf> on Oct. 22, 2013, pates 1-97.

Johnson Screens, Inc., "Johnson Intake Screens: Higher Capacity and Superior Fish Protection," downloaded from <http://www.mequipco.com/prod_brochures/johnson1.pdf>, (c) 2000, JS-IT-BR-0500-5314, pp. 1-8.

Johnson Screens, Inc., "Johnson Screens High Capacity Intake Screens," downloaded from <http://www.johnsonscreens.com/sites/default/files/Passive%20Intake%20Screens.pdf>, (c) 2010, 6331.01, pp. 1-4.

U.S. Fish and Wildlife Service, "Evaluation Plan: USBR Flat Plate Screen at Coleman National Fish Hatchery Intake No. 3, (Contract No. 14-48-0001-96044)," Mar. 1999, prepared by Jones & Stokes Associates and Motgomery Watson, pp. 1-44.

Japanese Patent Office, Japanese Patent Application No. 2012-197506 Office Action dated Jul. 23, 2013, pp. 1-8.

European Patent Office; European Patent Application No. 12183752.0; Examination Report dated Apr. 16, 2015, 4 pages.

* cited by examiner

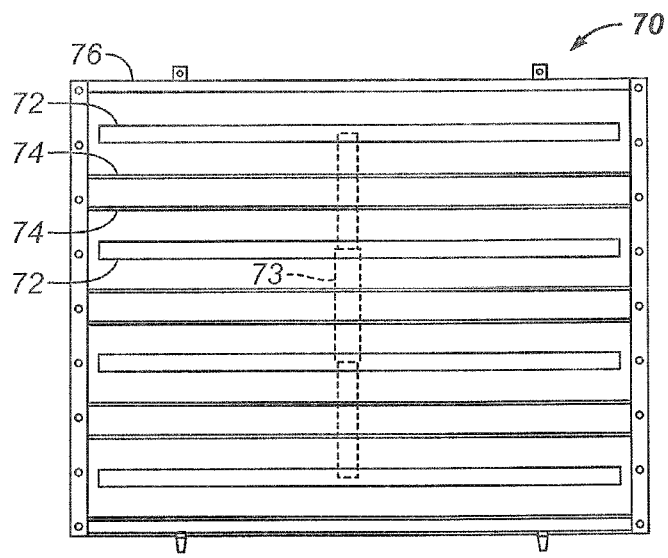
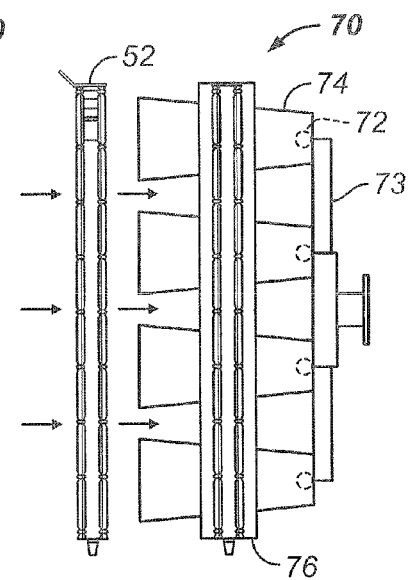
FIG. 3A (Prior Art)
FIG. 3B (Prior Art)
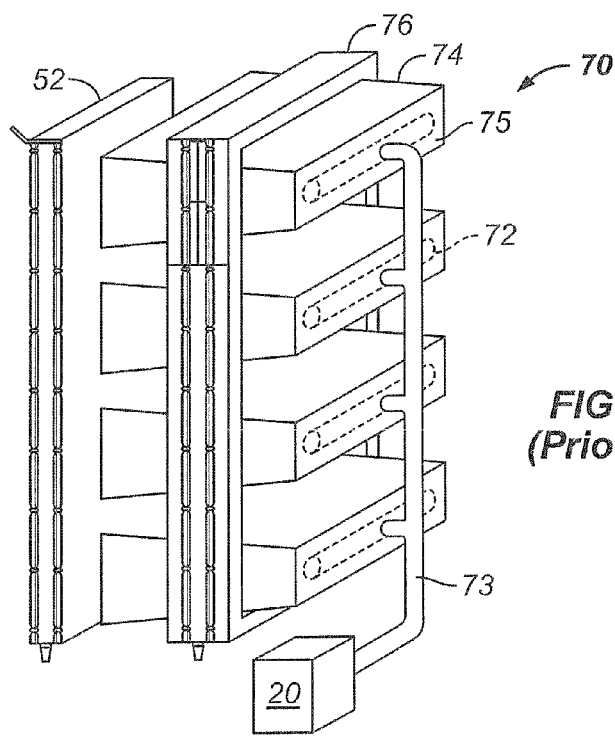
FIG. 3C (Prior Art)

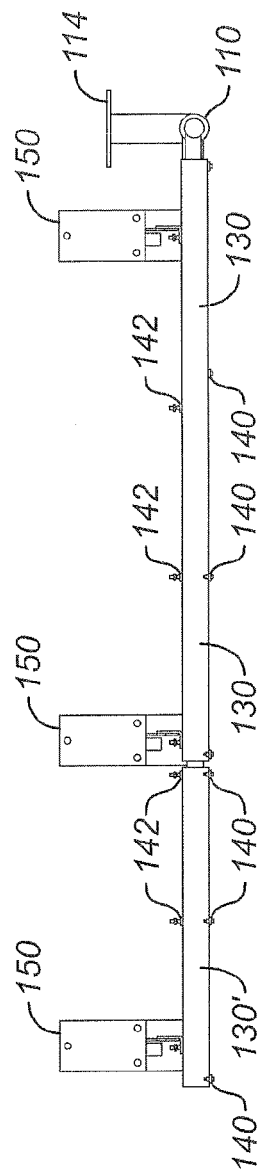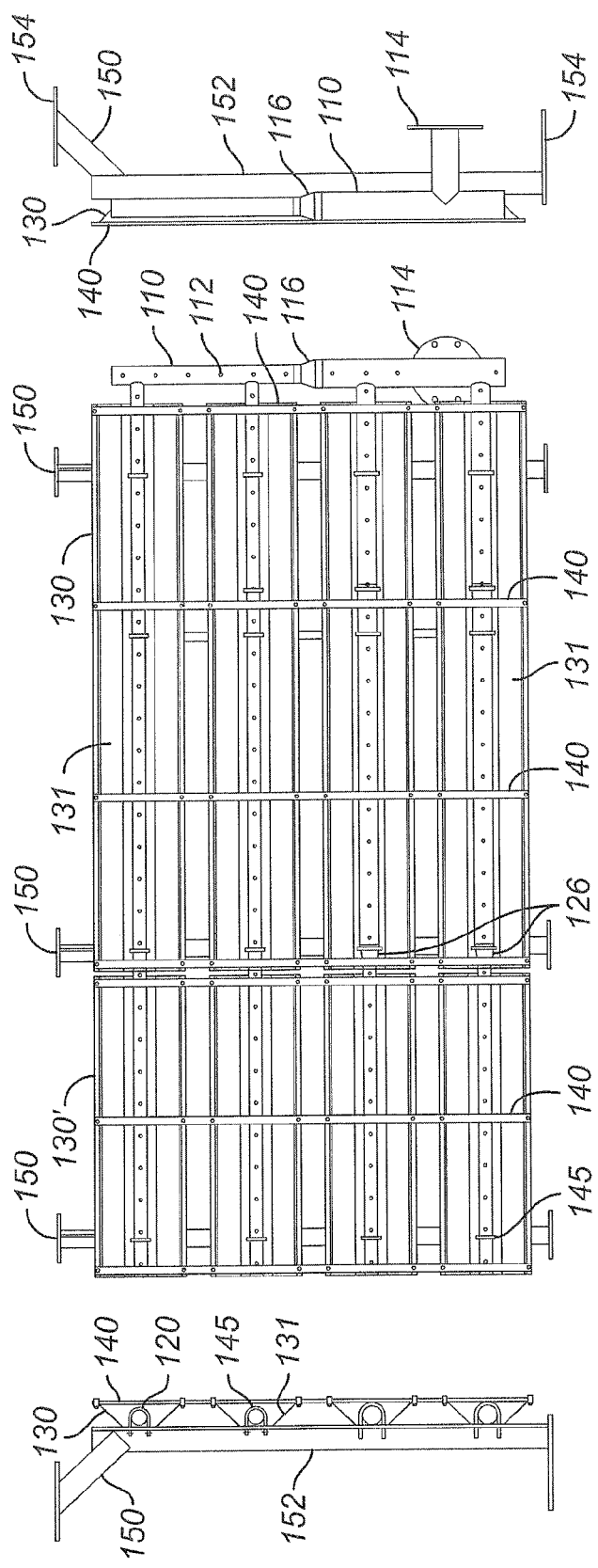
FIG. 6A
FIG. 6B
FIG. 6C
FIG. 6D

DIRECTED HYDROBURST SYSTEM FOR CLEANING FLAT SCREENS

CROSS-REFERENCE TO RELATED APPLICATION

This application is a continuation of U.S. patent application Ser. No. 13/228,228, filed Sep. 8, 2011, the contents of which are hereby incorporated by reference in their entirety.

BACKGROUND

Water intake systems use various types of screens and barriers, and several systems have been developed to clean debris from the screens. For example, mechanical systems that use moving brushes have been used to clear screens of debris. In addition, removable forms of screens have been used in many locations to overcome cleaning issues.

In other implementations, screen cleaning systems can use bursts of air directed from a manifold to clean the screen of debris. For example, Johnson Screen's Hydroburst System is one system used for cleaning cylindrical intake screens. FIGS. 1A-1C show a water intake system 10 having a hydroburst system 20 according to the prior art. The hydroburst system 20 is used for implementations where the intake screen 30 may need regular cleaning when exposed to debris or when the screen 30 is difficult to access. When operated, the hydroburst system 20 flushes the debris away from the screen's surface by releasing a large volume of compressed air inside the screen 30 in a quick burst.

As shown in FIGS. 1A-1B, the hydroburst system 20 has a receiver tank 22 that stores compressed air and has a compressor 24 that charges the tank 22 with the compressed air. Distributor piping 28, valves 25, and the like couple the tank 22 to a header in the screen 30. Finally, a control panel 26 controls operation of the system 20.

The cylindrical screen intake 30 shown in FIG. 1C has a tee configuration with two screens 36 on opposing ends of a central body 34. A water outlet 32 connects from the central body 34 for connecting to other components of the water intake system 10. Air backwash headers 40 disposed in the screens 36 connect to an inlet pipe 42 that receives air from the hydroburst system 20. When an airburst communicated from the hydroburst system 20 reaches the headers 40, the resulting burst of air/water can clean the cylindrical screens 36 of debris.

Cleaning a screen with an airburst can be more difficult when the screen is flat. Such flat screens can be used for a number of applications, including water intake systems and fish diversion in dam and river systems to protect fish from hydroelectric turbines and pumps. Typically, the flat screens for these applications have a low-suction velocity to protect fish and other aquatic life. Yet, debris may still be able to collect on the screens.

One solution by Montgomery Watson Engineering for clearing debris from a flat screen is shown in FIGS. 2A-2B. A water intake module 50 buries in a bed of a waterway so that a portion of the module 50 sticks above the bed. The module 50 has a nose shield 54 at its upstream end. A supply pipe 56 runs from the module 50 to a water intake system, and a cleaning air pipe 60 and a buoyancy air pipe 65 run from the module 50 to components of an air supply system.

Internally, the module 50 contains flat fish screens 52, flow control slats 64, airburst cleaning pipes 62, floatation tanks 67, and a supply pipe connection 55. The flat screens 52, slats 64, and airburst pipes 62 situate at the top of the module 50, while the floatation tanks 67 situate at the bottom. The cleaning air pipe 60 of FIG. 2A connects to the airburst pipes 62 shown in FIG. 2B, and the buoyancy air pipe 65 of FIG. 2A connects to the flotation tanks 67 shown in FIG. 2B.

During use, water flows downward through the flat screens 52 and past the slats 64 into the module's collection chamber where the water can then travel to the supply pipe 56. The airburst pipes 62 are horizontally arranged PVC pipes located between the flat screens 52 and slats 64. These pipes 62 have small holes and distribute an airburst for cleaning the flat screens 52 when a burst of air is supplied. The slats 64 and pipes 62 have been used with horizontal modules 50 as shown in FIG. 2B, but they have also been used for vertical modules (not shown).

Another solution from Johnson Screens for clearing debris from a flat screen is shown in FIGS. 3A-3C. Here, a horizontal manifold 70 is used to clean a flat screen 52. The manifold 70 has distributor pipes 72 enclosed by troughs 74. A manifold frame 76 couples to the screen 52 or anchors by suitable stabilizing means downstream of the screen 52. Either way, the manifold frame 76 supports the deep troughs 74, which facilitate airflow from a backwash system 20 to the screen 52. As best shown in FIG. 3C, the troughs 74 have back panels 75, which can be solid as shown. Alternatively, the back panels 75 can be perforated or may not be present so water can flow through the deep troughs 74.

To provide the airflow, a conduit 73 couples from the backwash system 20 to each distributor pipe 72 enclosed in the troughs 74. Each distributor pipe 72 has a plurality of orifices (not shown) to direct a burst of air outwards toward the screen 52. When the backwash system 20 produces an airburst, for example, the air is directed from the pipes 72 and troughs 74 to the opposing screen 52 to clear debris. Water flow through the screen 52 and between the troughs 74 is shown by arrows.

Although the manifold 70 of FIGS. 3A-3C and other prior art systems may be effective, constructing such a trough-type manifold can be complicated and cost prohibitive for some implementations. Therefore, it would be useful for operators to be able to clean flat type screens effectively with an airburst system. The subject matter of the present disclosure is directed to overcoming, or at least reducing the effects of, one or more of the problems set forth above.

SUMMARY

A screen intake system has a body with an open end and a chamber. A flat screen is disposed in the open end of the body. To keep the screen clear of debris, an airburst system has pipes disposed in the chamber. The pipes dispose parallel to one another adjacent the flat screen, and each of the pipes has orifices in a side facing the flat screen. Directors dispose along the backs of the pipes, and each of the directors has a channel in which the pipe disposes. Compressed air is released by valves from a tank, and the airburst is dispersed from the pipe's orifices. Each of the directors directs the resulting water/airburst from the orifices toward the adjacent flat screen to clear it of debris.

The foregoing summary is not intended to summarize each potential embodiment or every aspect of the present disclosure.

BRIEF DESCRIPTION OF THE DRAWINGS

FIG. 3A shows a front view of another arrangement for cleaning a flat screen according to the prior art.

FIGS. 3B-3C shows the arrangement of FIG. 3A using side and perspective views relative to a flat screen.

FIGS. 6A-6D show front, end, and top views of the airburst distribution system.

DETAILED DESCRIPTION

Figure 4A:
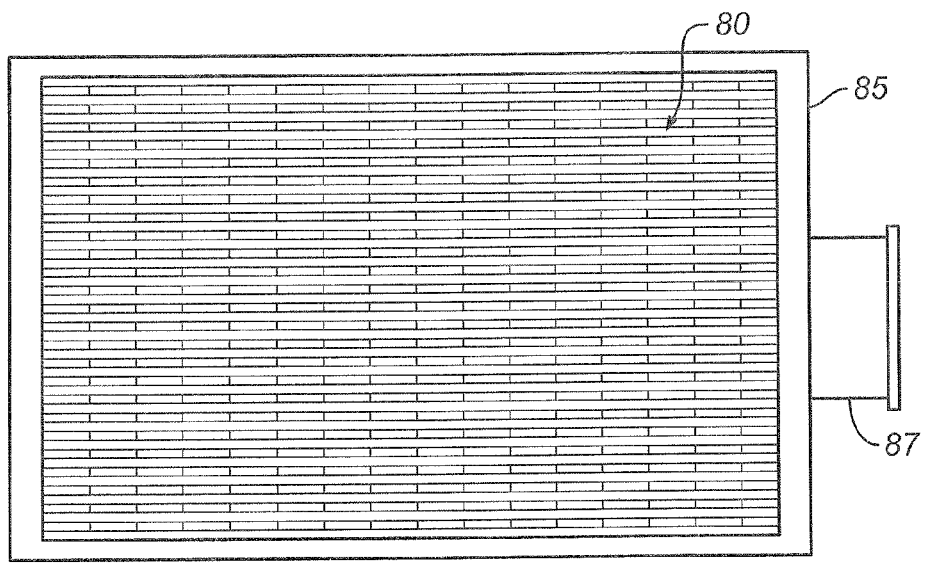
FIG. 4A schematically shows a plan view of a flat screen in an enclosure.

As noted previously, water intakes, diversion panels, and other applications may have flat screens. FIG. 4A schematically shows a plan view of a flat screen 80 in an enclosure 85. The flat screen 80 is composed of parallel wires attached to rods arranged perpendicular thereto. The wires can be profiled wire or any other suitable type of wire for a screen, filter, diversion panel, or the like. The enclosure 85 is only schematically depicted in the Figures for illustration purposes and may have one or more outlets 87 as shown. Depending on the implementation, the enclosure 85 can be any suitable module, component, pipe, conduit, outlet, inlet, or the like for a water intake, filtration, diversion, or other type of system.

Figure 4B:
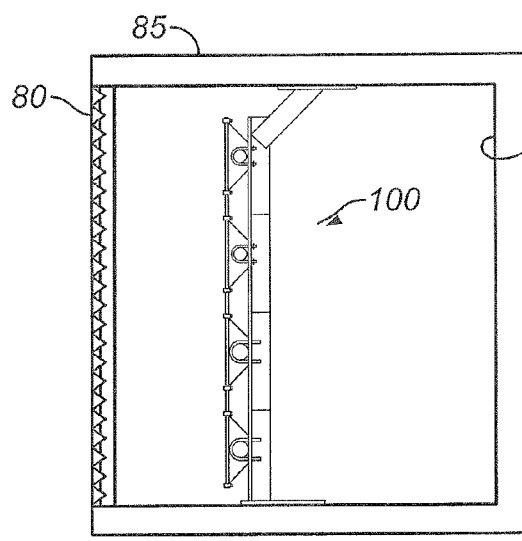
FIG. 4B shows a vertical orientation of the flat screen with an airburst distribution system of the present disclosure.
Figure 4C:
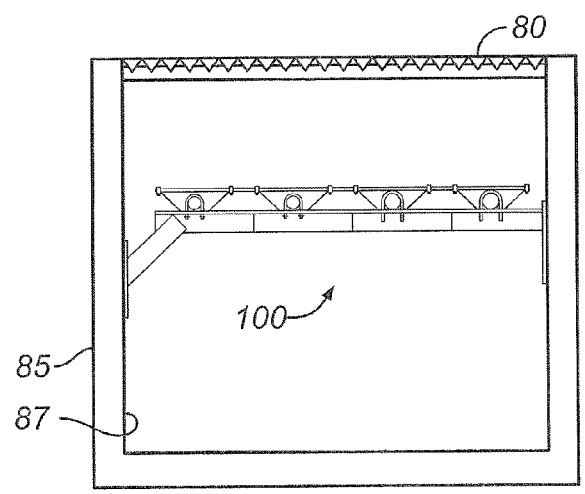
FIG. 4C shows a horizontal orientation of the flat screen with the airburst distribution system.

As shown in FIG. 4B, the flat screen 80 can be situated vertically in an open end of the enclosure 85. Alternatively, the flat screen 80 can be situated horizontal as shown in FIG. 4C, although any orientation may be used. Either way, the flat screen 80 may collect debris carried by water passing through the screen 80 into the enclosure 85.

Figure 1A:
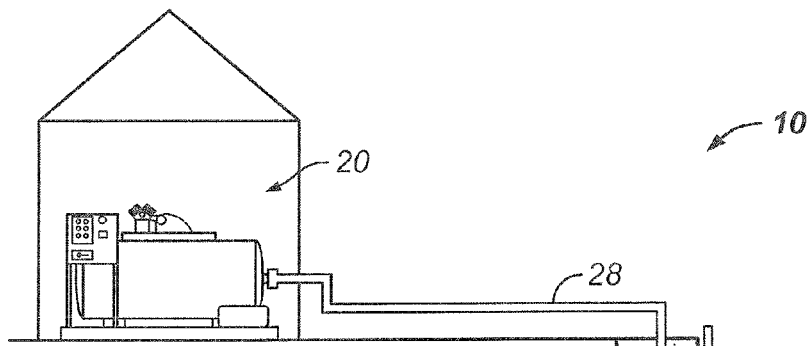
FIG. 1A illustrates a water intake system according to the prior art.
Figure 1B:
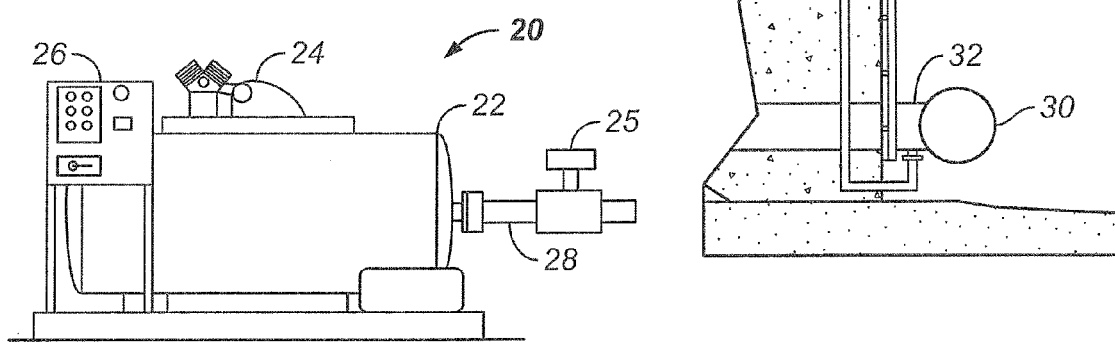
FIG. 1B illustrates components of the system in more detail.
Figure 1C:
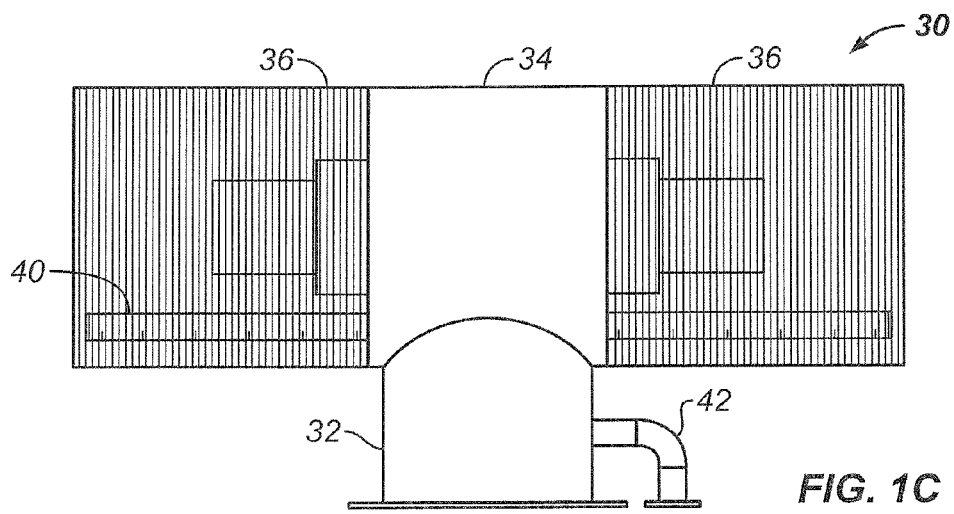
FIG. 1C shows a cylindrical screen intake with manifold according to the prior art.
Figure 2A:
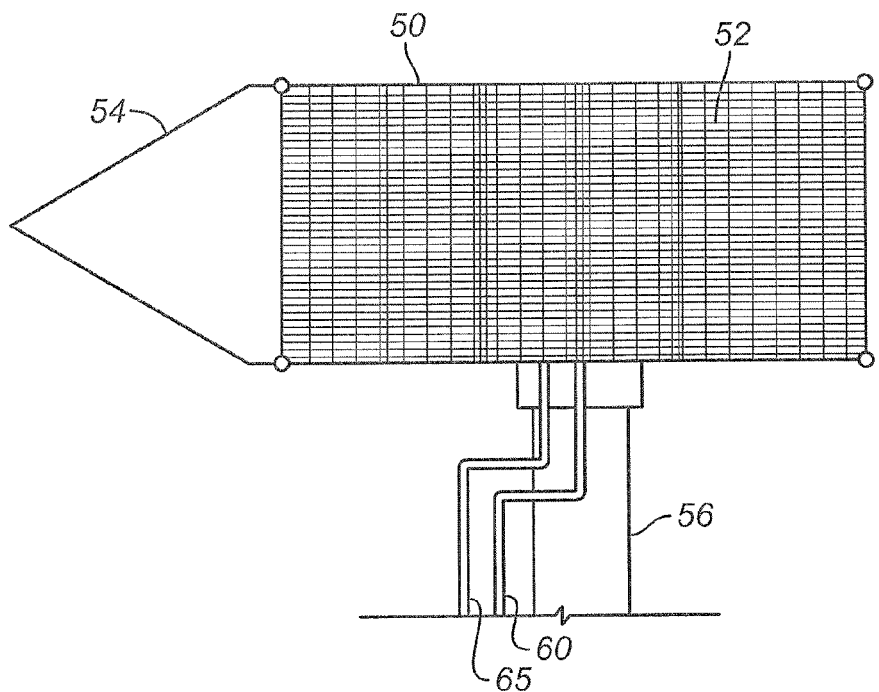
FIGS. 2A-2B show one arrangement for cleaning a flat screen according to the prior art.
Figure 2B:
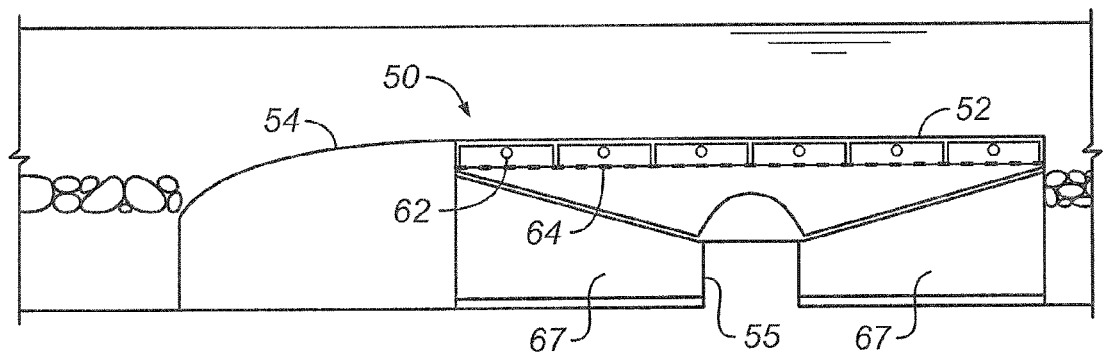

To clear the debris periodically, an airburst distribution system 100 of the present disclosure disposes parallel to the screen 80. This system 100 couples to components of an hydroburst system, such as described previously with reference to FIG. 1. As noted above, such a hydroburst system has a tank, a control panel, rapid actuating air valves, connecting piping, and an air compressor for providing a quick airburst of compressed air. When activated manually or automatically on a periodic basis, the airburst from the hydroburst system enters the airburst distribution system 100, which disperses the air in the enclosure 85 relative to the panel screen 80 to dislodge any collected debris.

One advantage of the airburst distribution system 100 is its modular nature and ability to fit a particular implementation. The system 100 can be constructed separately from the components of the enclosure 85 and the flat screen 80. The pre-assembled system 100 can then be conveniently incorporated into the enclosure 85 adjacent the screen 80 to meet the debris cleaning needs of the installation.

The airburst distribution system 100 is depicted in FIGS. 4A-4B with a relative size compared to the flat screen 80 and the enclosure 85. The depicted sizes are for illustrative purposes. In general, the relative size between the airburst distribution system 100, the flat screen 80, and the enclosure 85 depends on the implementation and details such as desired flow rates, need for debris cleaning, amount of compressed air that can be produced in an airburst, and other practical factors. Moreover, one or more airburst distribution systems 100 may be situated adjacent a flat screen 80, and all or just a portion of the screen 80 may have an airburst distribution systems 100 adjacent to it.

Turning now to particular details shown in FIGS. 5A-5B, 6A-6D, and 7, the airburst distribution system 100 has a manifold 110, distribution pipes 120, directors 130, braces 140/142, and brackets 150. The manifold 110 has an inlet 114 that connects to components of the hydroburst system providing the supply of compressed air. Along its length, the manifold 110 can have orifices 112 for dispersing air to the surroundings. The orifices 112 are arranged in the manifold 110 to uniformly disperse the air.

Extending parallel to one another off the manifold 110, the distribution pipes 120 convey air from the manifold 110 so the air can be dispersed out of orifices 122 in the pipes 120. These distribution pipes 120 run parallel to the surface of the flat screen (80). The number of pipes 120, their diameters (or flow areas), the number of orifices 122, and other considerations depend on the particular implementation.

An arrangement of directors 130 directs the force of the release and burst of air from the pipes 120 toward the surface of the flat screen (80). In turn, the airburst forces debris away and scours the screen's surface. The directors 130 run longitudinally behind each of these distribution pipes 120, essentially separating or isolating the parallel pipes 120 from one another. The directors 130 may run the entire length of the pipes 120 or more than one director 130 can be set end to end along the length of a given pipe 120 to complete its entire distance.

To support the directors 130, the system 100 affixes the various directors 130 together in a lattice. Fasteners 145, which can be U-bolts or the like, affix the directors 130 to the distribution pipes 120 at various points along the lengths of the pipes 120. Additionally, the braces 140/142, which are laterally arranged fasteners, affix to the fronts and backs of the directors 130 and interconnect them to one another in the lattice. As shown, these braces 140/142 can be thin metal bars affixed by bolts or other fasteners to the directors 130.

Finally, to support the manifold 110, pipes 120, and directors 130, a number of support brackets 150 affix to the backs of the directors 130. These brackets 150 include legs 152 that attach across the backs of the parallel directors 130. Ends of the legs 152 have feet 154/156 to affix the brackets 150 to any other component, such as an enclosure, pipe, concrete wall, other bracket, or the like, as shown in FIGS. 4B-4C, for example.

Figure 7:
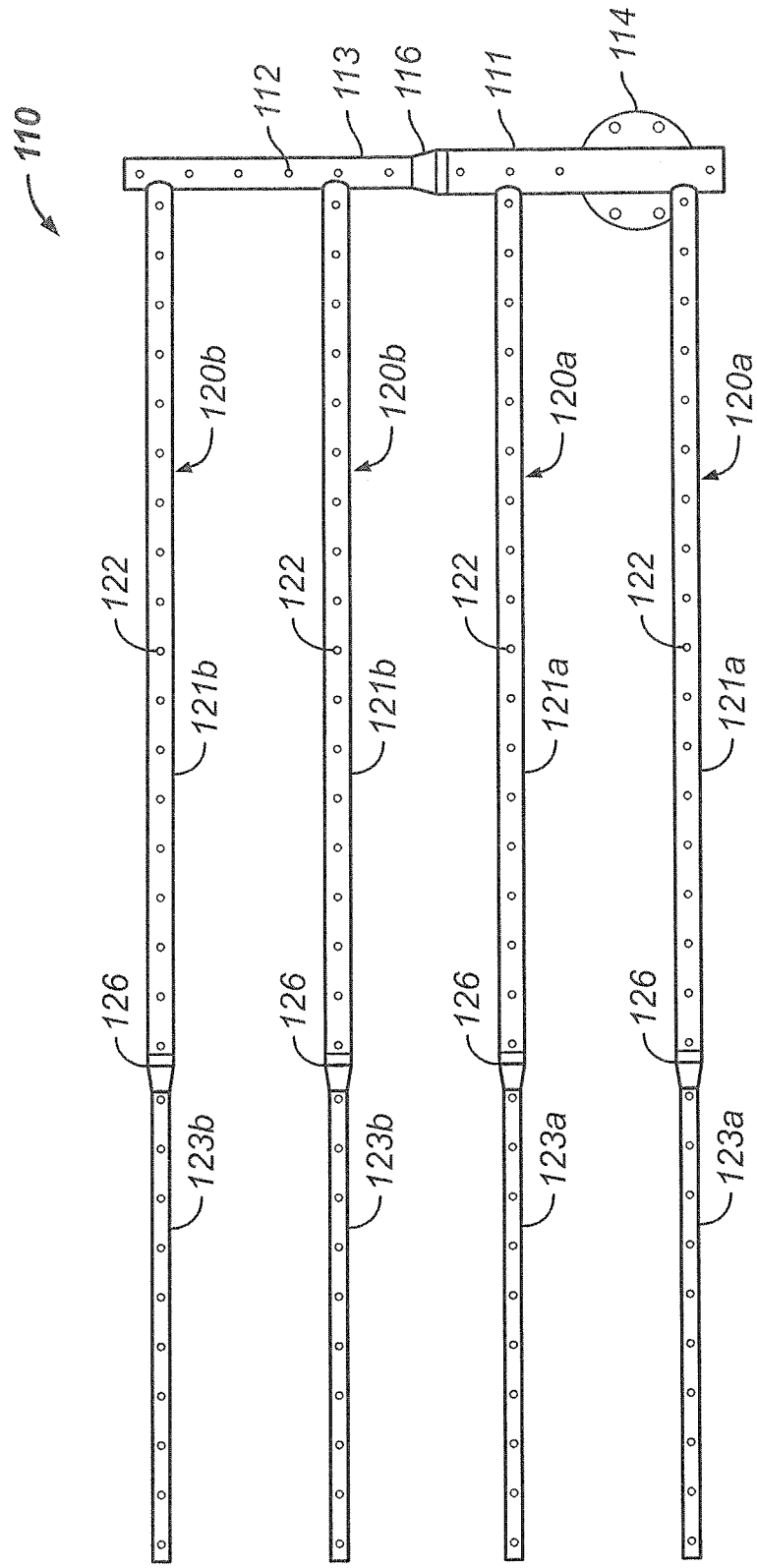
FIG. 7 shows an isolated front view of the manifold and pipes for the airburst distribution system.

As best shown in the isolated front view of FIG. 7, the manifold 110 includes a reducer 116 disposed between a proximal end 111 (connected to the inlet 114 and two of the pipes 120*a*) and a distal end 113 (connected to the other two pipes 120*b*). The diameter (or flow area) of the manifold 110 changes at the reducer 116. For example, the mandrel's larger portion 111 may have a diameter of about 3-in., while the mandrel's smaller portion 113 may have a diameter of about 2-in.

The (two lower) pipes 120*a* have their proximal ends 121*a* connected to the mandrel's larger diameter portion 111 and have a larger diameter (or flow area) compared to the (two upper) other pipes 120*b*, which have their proximal ends 121*b* connected to the mandrel's smaller diameter portion 113. For example, the (two lower) pipes 120*a* may have an initial diameter at their proximal ends 121*a* of about 2-in., while the (two upper) pipes 120*b* may have an initial diameter at their proximal ends 121*b* of about 1.5-in.

The pipes 120 also include reducers 126 at about three-fourths of the length of the pipes 120 in which the diameter (or flow area) of the pipes 120 decreases toward the pipes' distal ends. For example, the (two lower) pipes 120*a* may reduce from the 2-in. diameter at their proximal ends 121*a* to about 1.5-in. diameter at their distal ends 123*a*. The (two upper) pipes 120*b* may reduce from the 1.5-in. diameter at their proximal ends 121*b* to about 1.25-in. diameter at their distal ends 123*b*. Moreover, the distal ends 123*a-b* are shorter in length than the proximal ends 121*a-b*, further reducing flow area. The reducers 116/126 and different diameter pipes 120*a-b* are intended to control the airflow exiting the orifices 112/122 down the length of the manifold 110 and pipes 120 and maintain suitable pressure for the airburst.

Figure 5A:
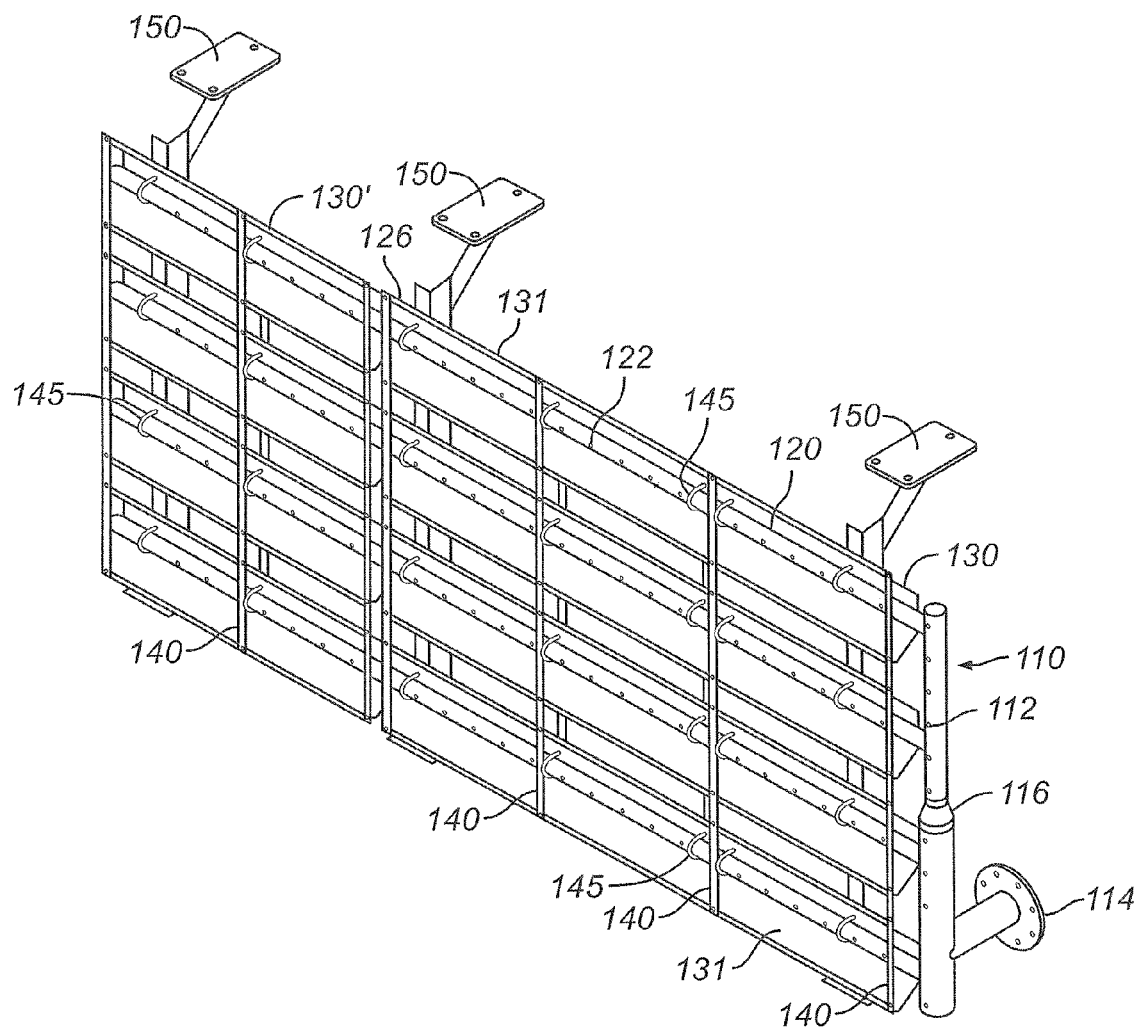
FIGS. 5A-5B show front and back perspective views of the airburst distribution system.
Figure 5B:
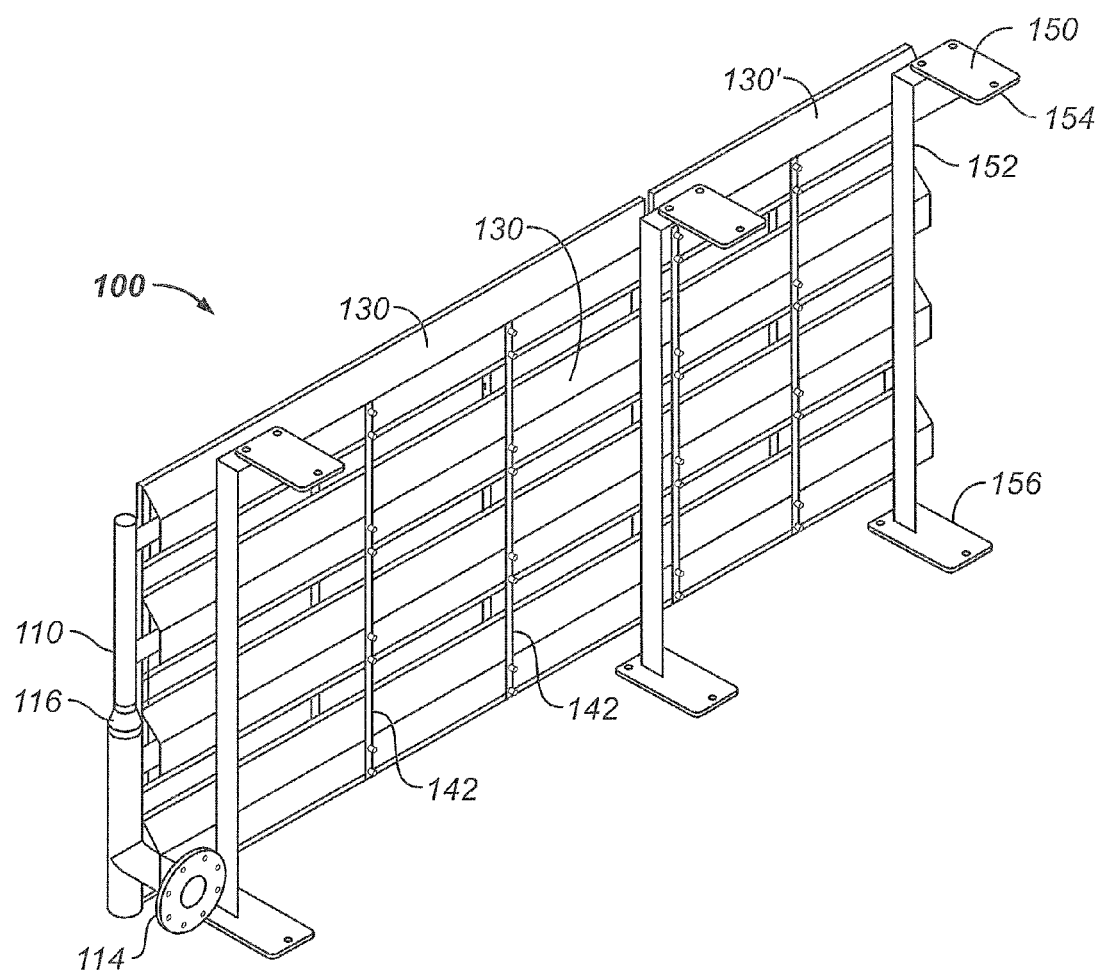

As best shown in FIGS. 5A-5B, separate directors 130' may be used due to the reduced diameter at the distal ends of the pipes 120. These separate directors 130' attach to the distal ends of the pipes 120 with fasteners 145 as before, but suited to accommodate the smaller diameter. Rather than using the separate directors 130', the directors 130 can extend the entire length of the pipes 120, and spacers can be used between the pipes' distal ends and the directors 130. Alternatively, the directors 130 extending the entire length of the pipes 120 can define a step or bend to accommodate the reduced diameter at the pipes' distal ends.

Figure 8A:
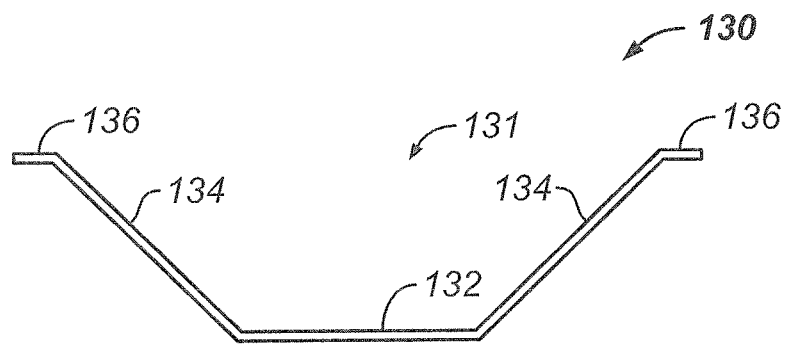
FIGS. 8A-8B show end and front views of a longitudinal director.
Figure 8B:
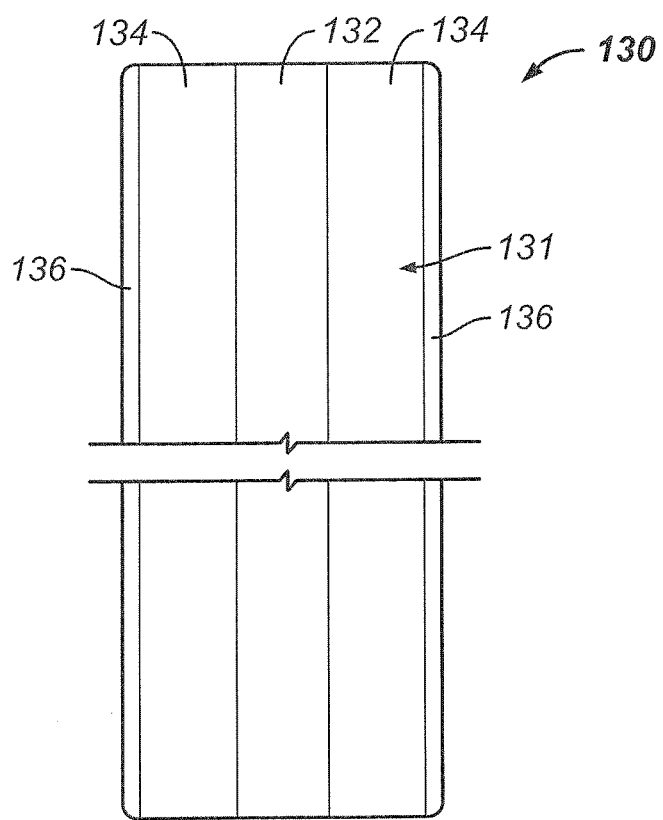

Preferably, gaps are present between edges of the directors 130, permitting water flow between the directors 130. Furthermore, each of the longitudinal directors 130 defines a longitudinal channel 131 behind the pipes 120. As shown in FIGS. 8A and 8B, the director's longitudinal channel 131 is formed by a backwall 132 and opposing sidewalls 134 that angle inward toward the backwall 132. Edge faces 136 can be provided on the upper and lower edges along the length of the director 130 for affixing the braces (140) thereto. The backwall 132 rests behind the distribution pipe (120), which has its orifices (122) facing away from the director 130.

Figure 8C:
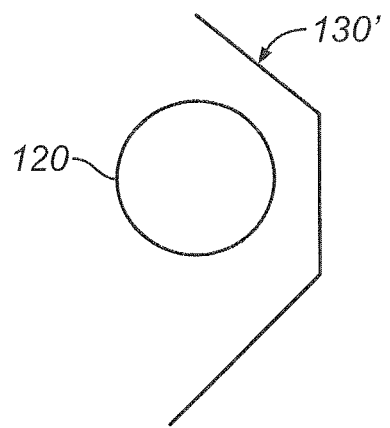
FIGS. 8C and 8D show end views of different shaped longitudinal directors relative to a pipe.
Figure 8D:
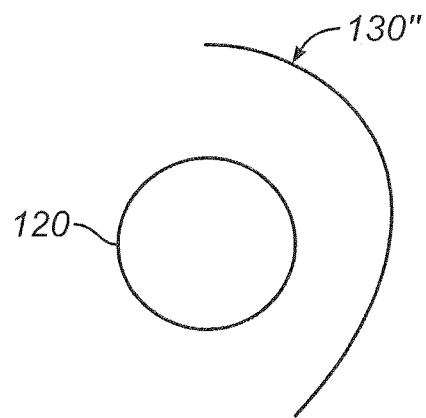
Figure 9A:
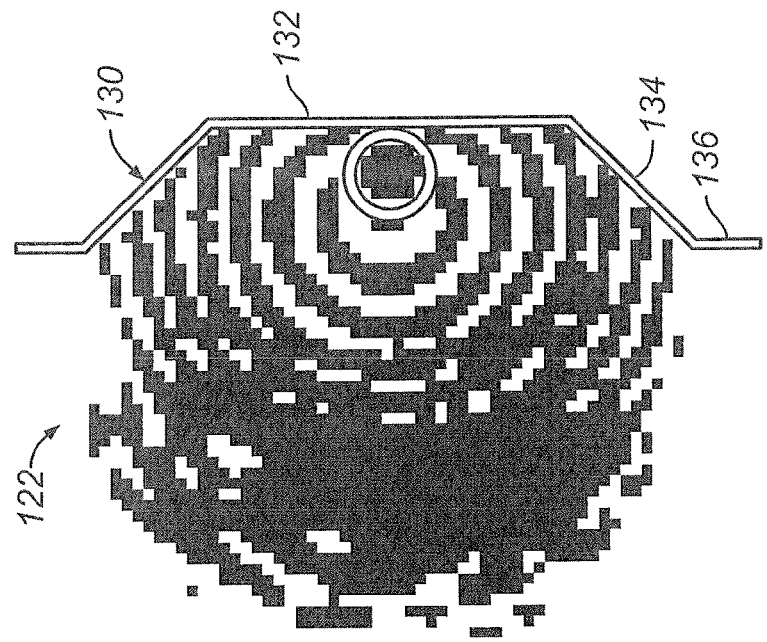
FIGS. 9A-9C diagrammatically show progression of an airburst from a distribution pipe and director of the disclosed system.
Figure 9B:
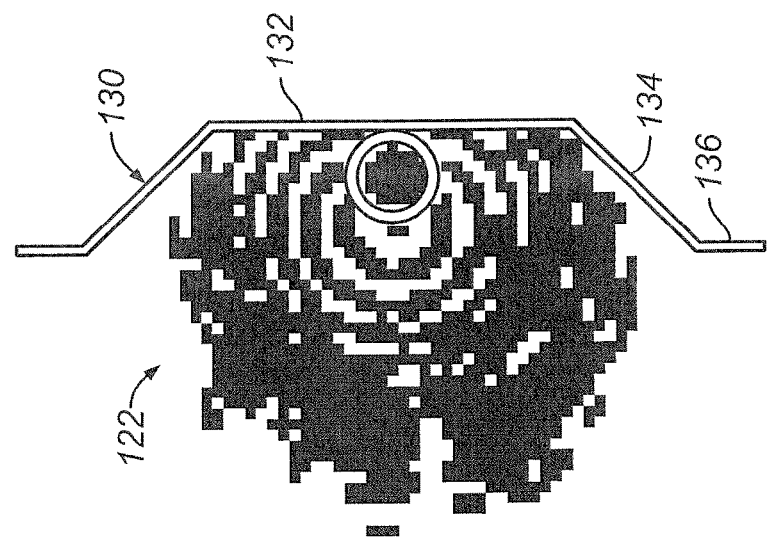
Figure 9C:
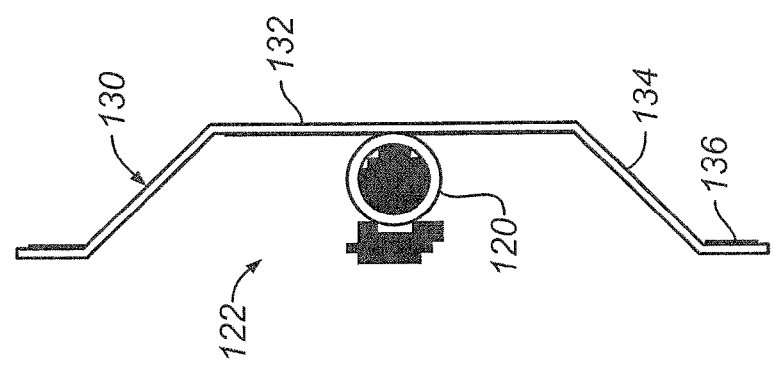

The overall length of the director 130 depends on the implementation. For example, the longer sectioned directors 130 can be about 71-in. long, while the shorter section directors 130' can be about 37.75-in. long. In general, the width of the directors 130 can be about 11-inches, while the depth can be about 2.88-inches. Compared to the larger pipes 120, which can have a diameter of about 1.5 to about 2-in., the depth of the director's channels 131 is at least less than or equal to about twice the pipe's diameter. Actual dimensions depend on the implementation and the size of distribution pipes 120, among other factors. Additionally, the shape and/or angle of the deflectors 130 can be altered. For example, rounded surfaces may also be employed in a similar fashion to the angled flat surfaces shown. Moreover, the cross-sectional shape of the deflector 130 need not be symmetrical as shown in FIG. 8A. Instead, the shape can be asymmetrical as with the deflectors 130' and 130" in FIG. 8C, shown relative to the cross-section of a pipe 120.

Because the disclosed airburst distribution system 100 must deliver an airburst to a flat screen disposed parallel thereto, the system 100 preferably delivers the airburst effectively to the adjacent screen. Effective delivery is at least partially achieved by the directors 130 of the disclosed system 100. In particular, FIGS. 9A-9C diagrammatically show progression of an airburst from a distribution pipe 120 and director 130 of the disclosed system.

When the airburst is initiated, the air leaves the forward facing orifices 122 in the distribution pipe 120 as shown in FIG. 9A. The distribution pipe 120 distributes the air in a generally radial direction from the orifices 122 in the pipe 120. As the leaving air expands from the orifice 122, it tends to travel outward in all directions from the orifice 122 and even tends to travel back behind the pipe 120 as shown in FIG. 9B.

However, the director 130 with its backwall 132 and inward opposing sidewalls 134 tends to focus or collect the airburst in a forward direction of the distribution pipe 120 as shown in FIGS. 9B-9C. This collects the airburst in a direction more suited for interacting with an adjacent flat screen at which the pipe 120 and director 130 face. In this way, the director 130 forces the air/water from the airburst in the direction best suited to clean the surface of a flat screen.

The foregoing description of preferred and other embodiments is not intended to limit or restrict the scope or applicability of the inventive concepts conceived of by the Applicants. Although referred to as providing an airburst, the disclosed system 100 can expel a burst of any suitable fluid (e.g., water, air, etc.) from the orifices 112/122 in the manifold 110 and pipes 120 to clear debris from an adjacent screen. Although the system 100 is described for use with a flat screen, the screen need not be strictly flat and may actually be curved either longitudinally, laterally, or both. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A debris cleaning apparatus for a screen, the apparatus comprising:

a plurality of pipes disposed parallel to one another and in fluid communication with a fluid inlet of the apparatus, each pipe having a first side configured to be proximate to the screen and having a second side opposite the first side, each pipe having a plurality of orifices in the first side for expelling fluid; and a plurality of directors, each director having a length, a front configured to be proximate to the screen, and a back opposite the front, the directors disposed parallel to one another and affixed to each other in a lattice, each director defining a channel in which at least one pipe is disposed, the channel having opposing edges along the length of the director and configured to be adjacent to the screen, each director comprising an edge face extending outward of the channel from each edge of the channel, each edge face extending along the length of the director and configured to face the screen, wherein each director is configured to direct fluid expelled from the orifices in the at least one pipe toward the adjacent screen.

2. The apparatus of claim 1, wherein the lattice comprises a plurality of fasteners laterally arranged to interconnect the directors to one another.

3. The apparatus of claim 2, wherein the fasteners are affixed to the edge faces of the directors.

4. The apparatus of claim 3, wherein the fasteners comprise thin metal bars.

5. The apparatus of claim 2, wherein the fasteners include first braces affixed to the edge faces of the directors.

6. The apparatus of claim 2, wherein the fasteners include second braces affixed to the backs of the directors.

7. The apparatus of claim 1, further comprising a plurality of brackets affixed to the backs of the directors.

8. The apparatus of claim 1, wherein each director comprises a plurality of walls defining the channel, the walls including a backwall and two opposing sidewalls, the backwall disposed adjacent the second side of the pipe and the two opposing sidewalls angled inward toward the backwall, each sidewall extending from the backwall to the respective edge of the channel from which the respective edge face extends.

9. The apparatus of claim 1, further comprising a manifold connecting the pipes in fluid communication with the fluid inlet of the apparatus.

10. The apparatus of claim 9, wherein the manifold defines a plurality of orifices.

11. The apparatus of claim 10, wherein the plurality of orifices in the manifold are formed in a side facing the screen.

12. The apparatus of claim 9, wherein the pipes have proximal and distal ends, the proximal ends in fluid communication with the manifold.

13. The apparatus of claim 12, wherein each of the pipes defines a first flow area at the proximal end and a second flow area at the distal end, the first flow area of each pipe being greater than the second flow area of each pipe.

14. The apparatus of claim 12, wherein the manifold defines at least two flow areas, a first of the flow areas of the manifold communicating the inlet of the apparatus to a second of the flow areas of the manifold, the first flow area of the manifold being greater than the second flow area of the manifold.

15. The apparatus of claim 14, wherein:
the proximal ends of one or more first of the pipes are in fluid communication with the first flow area of the manifold,
the proximal ends of one or more second of the pipes are in fluid communication with the second flow area of the manifold, and
wherein the one or more first pipes have a larger flow area than a smaller flow area of the one or more second pipes.

16. The apparatus of claim 1, wherein the channels each define a depth that is less than or equal to two times a diameter of the pipe disposed therein.

17. A debris cleaning apparatus for a screen, the apparatus comprising:
a manifold having a first flow area in fluid communication with a second flow area, the first flow area being greater than the second flow area and being in fluid communication with an inlet of the apparatus;
a plurality of pipes disposed parallel to one another and in fluid communication with the manifold, each pipe having a first side adjacent the screen and having a second side opposite the first side, each pipe having a plurality of orifices in the first side, at least one first of the pipes in fluid communication with the first flow area of the manifold, at least one second of the pipes in fluid communication with the second flow area, the at least one first pipe defining a larger flow area than a smaller flow area of the at least one second pipe; and
a plurality of directors, the directors disposed parallel to one another and affixed to each other in a lattice, each director defining a channel in which at least one pipe is disposed, the channel having opposing edges along the length of the director and configured to be adjacent to the screen, each director comprising an edge face extending outward of the channel from each edge of the channel, each edge face extending along the length of the director and configured to face the screen,
wherein each director is configured to direct an airburst from the orifices in the at least one pipe toward the adjacent screen.

18. The apparatus of claim 17, wherein the larger flow area of the at least one first pipe includes third and fourth flow areas, the third flow area in fluid communication between the manifold and the fourth flow area and being greater than the fourth flow area.

19. A screen intake system, comprising:
a body having an open end and defining a chamber;
a screen disposed at the open end of the body;
a plurality of pipes disposed parallel to one another in the chamber and in fluid communication with an inlet of the system, each pipe having a first side adjacent the screen and having a second side opposite the first side, each pipe having a plurality of orifices in the first side; and
a plurality of directors, each director having a length, a front configured to be proximate to the screen, and a back configured to be distal from the screen, the directors disposed parallel to one another and affixed to each other in a lattice, each director defining a channel in which at least one pipe is disposed, the channel having opposing edges along the length of the director and configured to be adjacent to the screen, each director comprising an edge face extending outward of the channel from each edge of the channel, each edge face extending along the length of the director and configured to face the screen,
wherein each director is configured to direct fluid expelled from the orifices in the at least one pipe toward the adjacent screen.

* * * * *